(12) United States Patent
Exline

(10) Patent No.: US 6,796,424 B2
(45) Date of Patent: Sep. 28, 2004

(54) COMPACT DISC HOLDER AND BOOKLET

(75) Inventor: Christopher P. Exline, Chagrin Falls, OH (US)

(73) Assignee: William Exline, Inc., Cleveland, OH (US)

( * ) Notice: Subject to any disclaimer, the term of this patent is extended or adjusted under 35 U.S.C. 154(b) by 193 days.

(21) Appl. No.: 10/095,405

(22) Filed: Mar. 11, 2002

(65) Prior Publication Data

US 2003/0029743 A1 Feb. 13, 2003

Related U.S. Application Data

(63) Continuation-in-part of application No. 09/927,253, filed on Aug. 10, 2001, now Pat. No. 6,634,493.

(51) Int. Cl.[7] .............................................. B65D 85/57
(52) U.S. Cl. ...................................... 206/232; 206/38.1
(58) Field of Search ...................... 206/308.1, 309–312, 206/232; D8/433; D9/346

(56) References Cited

U.S. PATENT DOCUMENTS

| | | | | |
|---|---|---|---|---|
| 4,778,047 A | * | 10/1988 | Lay ............................ 206/749 |
| 4,850,731 A | * | 7/1989 | Youngs .................... 206/308.1 |
| 5,085,318 A | | 2/1992 | Leverick ..................... 206/312 |
| 5,556,683 A | * | 9/1996 | Ranalli ......................... 428/76 |
| 5,588,527 A | * | 12/1996 | Youngs .................... 206/308.1 |
| 5,595,401 A | | 1/1997 | Exline et al. ................... 281/2 |
| 5,669,491 A | | 9/1997 | Pettey ........................ 206/232 |
| 5,690,219 A | | 11/1997 | Harrer ...................... 206/308.1 |
| 5,725,093 A | | 3/1998 | Yamaguchi et al. ..... 206/308.1 |
| 5,749,463 A | | 5/1998 | Collins ..................... 206/308.1 |
| 5,775,490 A | | 7/1998 | Baker et al. ............. 206/308.1 |
| 5,782,349 A | * | 7/1998 | Combs ..................... 206/308.1 |
| 5,800,659 A | | 9/1998 | Exline et al. ............... 156/250 |
| 5,806,672 A | | 9/1998 | Bosworth ................... 206/310 |
| 5,819,926 A | | 10/1998 | O'Brien et al. .......... 206/308.1 |
| 5,857,565 A | | 1/1999 | Baker et al. ................ 206/232 |
| 5,901,843 A | | 5/1999 | Gambardella et al. ... 206/308.1 |
| 5,913,539 A | | 6/1999 | Exline et al. ................... 281/2 |
| 5,931,293 A | | 8/1999 | Seelenmeyer ............ 206/308.1 |
| 5,957,281 A | | 9/1999 | Collins ..................... 206/307.1 |
| 5,971,157 A | | 10/1999 | Howell et al. ............. 206/755 |
| 6,032,795 A | | 3/2000 | Ehrlund et al. ............ 206/312 |
| 6,044,969 A | | 4/2000 | Denize et al. ........... 206/308.1 |
| 6,059,316 A | | 5/2000 | Whittington ................ 281/38 |
| 6,068,116 A | | 5/2000 | Bankhead ................... 206/232 |
| 6,073,763 A | | 6/2000 | Collins ..................... 206/308.1 |

(List continued on next page.)

OTHER PUBLICATIONS

Case Logic Corp., *Case Logic Products: Product Categories: Audio* (last visited Jan. 14, 2002) <http://www.casedirect.com/cgibin/sgdynamo.exe?CODIV=0101&HTNAME=audio.htm&UID=!+USID!>.

Case Logic Corp., *Case Logic Products: Product Categories: Storage Sleeves*, (last visited Jan. 14, 2002)http://www.casedirect.com/cgibin/sgdynamo.exe?CODIV=0101&HTNAME=storSlv.htm&UID=2002011412100249>.

Univenture, Inc., *Disc Packaging Systems*, (last visited Jan. 14, 2002) <http://www.univenture.com/index.html>.

Primary Examiner—Jila M. Mohandesi
(74) Attorney, Agent, or Firm—Womble Carlyle Sandridge & Rice, PLLC; C. Robert Rhodes; Craig H. Popalis

(57) ABSTRACT

A combination compact disc holder and informational booklet includes a cover and a plurality of pages, the cover and pages being made of substantially rectangular paper sheets. The cover is constructed of heavier stock and includes at least one pocket having such size and shape as to retain a compact disc therein. The pages are constructed of lighter stock and carry printed information concerning the content of the compact disc stored in the at least one pocket. The pages are folded and sewn along a fold line, and the cover is glued to an outer surface of an outermost page. The holder/booklet may include at least one compact disc pocket at least partially formed of heat-sealable materials.

11 Claims, 13 Drawing Sheets

U.S. PATENT DOCUMENTS

| | | | | |
|---|---|---|---|---|
| 6,105,762 A | * | 8/2000 | Pettey | 206/232 |
| 6,106,015 A | * | 8/2000 | Udwin et al. | 281/29 |
| 6,109,432 A | | 8/2000 | Pozzoli | 206/232 |
| 6,110,551 A | | 8/2000 | Exline et al. | 428/40.1 |
| 6,120,228 A | | 9/2000 | Exline | 412/2 |
| 6,170,658 B1 | | 1/2001 | Dering | 206/308.1 |
| 6,186,320 B1 | | 2/2001 | Drew | 206/308.1 |
| 6,186,332 B1 | | 2/2001 | Combs | 206/759 |
| 6,216,862 B1 | | 4/2001 | Chang | 206/308.1 |
| 6,220,504 B1 | | 4/2001 | Flynn et al. | 229/71 |
| 6,276,523 B2 | * | 8/2001 | Sanders | 206/308.1 |
| 6,484,878 B1 | * | 11/2002 | Combs | 206/308.1 |
| 6,634,493 B2 | * | 10/2003 | Exline | 206/232 |

\* cited by examiner

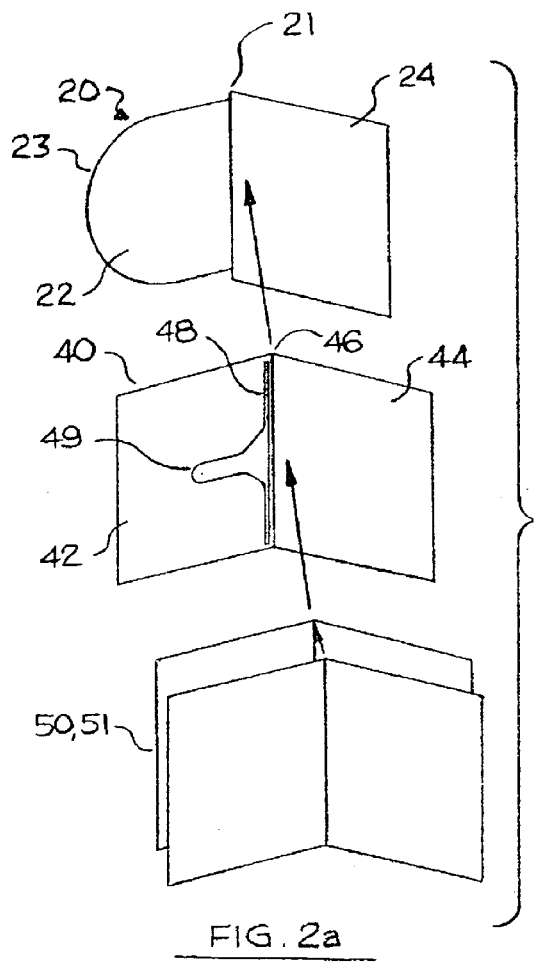
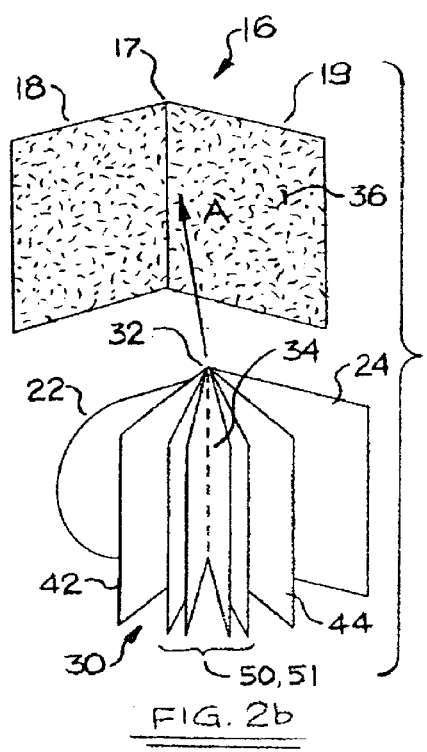
FIG. 2a
FIG. 2b
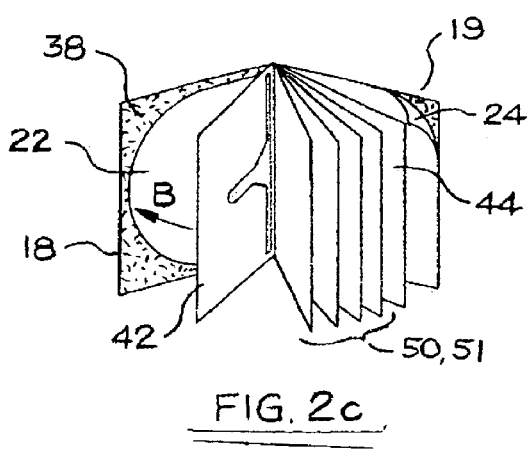
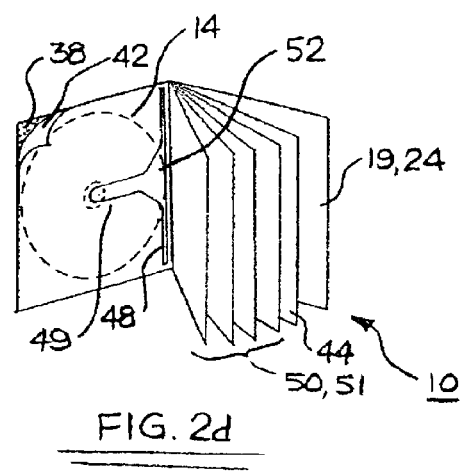
FIG. 2c
FIG. 2d

COMPACT DISC HOLDER AND BOOKLET

RELATED APPLICATIONS

This application is a continuation-in-part of application Ser. No. 09/927,253, filed Aug. 10, 2001, now U.S. Pat. No. 6,634,493

BACKGROUND OF THE INVENTION

1. Field of the Invention

The present invention relates generally to holders for compact discs, and more particularly, to compact disc holders that include printed information that accompanies the discs.

2. Description of the Prior Art

Compact discs have become a convenient, durable, and efficient means for digitally storing recorded music and computer software and data. Compact discs are round discs that are about 4¾ inches in diameter and slightly over 1 millimeter thick. Therefore, these discs are generally stored and transported in containers that are relatively flat.

Audio compact discs and compact discs containing computer software or data are typically stored in flat square plastic cases known as "jewel boxes". These cases include a square hard plastic base with a receptacle for holding a compact disc, and a hinged hard plastic cover that is attached to the base. While these cases have proven to be effective for storing compact discs, the plastic cases can be fragile and the simple hinge connections are prone to breakage. These cases are particularly subject to breakage when transported by mail. These cases also are relatively expensive to manufacture. Furthermore, the inclusion of printed material on or with such cases is problematic. It is often desirable to include printed information such as song lyrics or information about the recording artist with audio compact discs. For computer software compact discs, it is often desirable to include printed information with the compact discs such as instructions for using the software. While jewel boxes can be sized to include printed inserts inside the cases with the compact discs, such inserts are easily separated from the case and can easily be lost or misplaced. Therefore, there is a need for an inexpensive holder for compact discs that protects the compact discs, is durable, and includes space for printed material in a form that is easily accessible and permanently attached to the compact disc holder.

Others have attempted to provide compact disc holders that are less expensive to manufacture and are less prone to breakage than jewel boxes. For example, U.S. Pat. No. 5,085,318 discloses a compact disc folder formed from a single piece of cardstock. The cardstock is folded upon itself in tri-fold fashion to form a front and rear panel with an inside pocket for holding a compact disc. While this folder appears to be relatively inexpensive to produce, the area available for printed material is limited to the front and rear panels. U.S. Pat. No. 5,669,491 discloses a compact disc folder booklet that includes a cover, a pocket on an inside portion of the cover for holding a compact disc, and a plurality of pages for providing printed text relating to the content of the compact disc. While this folder addresses the need for providing a means for including printed material that is integral with a compact disc holder, the construction of this folder is complex, and accordingly, its production cost is unnecessarily high. For example, the cover and packet portion are formed from a single piece of material that is complex in shape and includes a series of tabs which must be punched from cardstock using expensive punches and dies. Simplifying the construction of such a folder would greatly reduce its cost of production. In addition, this folder requires a plurality of staples to connect the pages of the booklet to the cover. These staples are necessarily exposed on the outside of the folder along its spine. The exposed staples are unattractive in appearance, may snag on clothing or skin, and may rust if exposed to moisture. Therefore, a compact disc holder and booklet without staples and having a more finished appearance is needed.

Therefore, there remains a need for an inexpensive, durable, and attractive compact disc holder that includes no exposed staples and provides a means for including printed matter that is integral with the compact disc holder.

SUMMARY OF THE INVENTION

The present invention therefore is directed to a combination compact disc holder and informational booklet including a cover and a plurality of pages. The cover includes at least one pocket that is sized and shaped to receive and retain a compact disc. At least the cover and pages are constructed of rectangular sheets of paper. In addition, the pages carry printed information concerning the content of the compact disc. The cover includes a first panel having a first pocket on an inside surface of the first panel. Also, the cover may further include a second panel having a second pocket on an inside surface of the second panel.

In one embodiment, a cover has a fold which divides the cover into a first panel and a second panel. The first and second panels each include an inside surface, an outside surface, a bottom edge, a side edge, and a top edge. A pocket sheet is provided that is substantially coextensive with the first panel. The pocket sheet is attached to the inside surface of the first panel along the bottom edge, the side edge, and the top edge by a C-shaped strip of adhesive, thereby forming a pocket. The pocket is of suitable size to receive and retain a compact disc and has an opening adjacent to the fold. The unglued edge of the pocket sheet includes a cutout to facilitate insertion and removal of a compact disc from the pocket. At least one additional leaf is connected to the cover at the fold to form additional pages.

In another approach, a first leaf is attached to the cover at the fold to form a first page and a second page. The first leaf and the cover are coextensive, and the first page has an upper edge. A first adhesive strip attaches the first page to the inside surface of the first panel along the bottom edge, and a second adhesive strip attaches the first page to the inside surface of the first panel along the side edge. A pocket which is of suitable size to receive and retain a compact disc is thereby formed between the first panel and the first page. The first page may further include a cutout along its upper edge to facilitate grasping a compact disc contained in the pocket. Further, the holder and booklet may include at least one additional leaf that is attached to the cover and to the first leaf along the fold to form additional pages. Each additional leaf, the first leaf, and the cover are substantially coextensive.

In still another approach, the first leaf is again attached to the cover at the fold to form a first page and a second page, but the first page is narrower and shorter than the first panel of the cover. A flood coated adhesive covers the inside surface of the first and second panels, and seals the first page to the inside surface of the first panel and the second page to the inside surface of the second panel. Portions of the adhesive along the bottom edge and side edge of the first panel are uncovered by the smaller first page, thereby forming an L-shaped strip of adhesive on the inside surface of the first panel. A second leaf attached to the cover along the fold forms third and fourth pages. The third page is attached to the inside surface of the first panel along its bottom edge and side edge by the L-shaped strip of adhesive. A pocket is thereby formed between the first page and the third page. The pocket has an opening along its upper edge and is of suitable size to receive and retain a compact disc. A plurality of additional leaves may be attached to the cover and first and second leaves along the fold to form additional pages.

In yet another approach, the cover has an extended panel (a third panel) approximately the same size as the first panel. A second fold parallel to the first fold divides the cover between the first panel and the third panel. The first panel has an inside surface, a top edge, and a bottom edge. The first leaf has a first page that is narrower than the first panel, so that when it is secured to the inner surface of the cover, it leaves exposed a first and second adhesive strip along the top and bottom edge of the inner surface of the cover. The first adhesive strip extends along the top edge of the first panel and the second adhesive strip extends along the bottom edge of the first panel. The third panel is then attached to the inside surface of the first panel along the top and bottom edges. A pocket is thereby formed between the first panel and the third panel of the cover, wherein the pocket has a pocket opening adjacent to the second fold and the pocket is of suitable size to receive and retain a compact disc. At least one additional leaf is folded and attached to the cover along the second fold to form pages, each leaf being coextensive with the assembled cover.

In an alternate approach, the first leaf may be coextensive with the cover and a pattern of L- or C-shaped adhesive strips may be applied between the first panel and first page to form a pocket. Also, in any of the above approaches, the rear cover panel may include a second pocket for a second compact disc.

In an additional approach, the cover again includes a first cover panel and a second cover panel. The cover is attached to the first page or fly leaf of a paper booklet by a flood coating of adhesive on the inside surface of the cover. The first leaf is folded and divided into a front page and rear page. The front page is cut to expose a C-shaped strip of adhesive. The second leaf and all other leaves include a fold that divides the leaves into front and rear pages. The front page of the second leaf includes a slit or cutout that is parallel to and adjacent to the fold and is at least as wide as the diameter of a compact disc. The front page of the first leaf is attached to the top, side, and bottom edges of the inside of the first cover panel by the C-shaped strip of adhesive. The cutout in the front page of the second leaf forms an opening to a pocket formed between the front pages of the first and second leaves. A cutout is provided along the edge of the slit away from the fold to facilitate grasping a disc in the pocket. A slit may also be provided in the rear page for similarly forming a second pocket inside the second cover panel.

The holder/booklet may also include at least one leaf formed into additional pockets. The leaf is longer by fifty percent and has first and second folds which form a first page, a middle page, and a third page. The first page is folded along the first fold and is connected to the middle page by a C-shaped strip of adhesive which has been rolled, screened, or printed onto the middle page, thereby forming a pocket. A cutout along the unglued and unfolded edge of the first page facilitates grasping a disc in the pocket. One or more of these pocketed leaves can be assembled into any of the holders and booklets summarized above to provide additional pockets for holding discs.

The pocketed leaf may also be even longer and include a third fold forming a fourth page. The fourth page is folded along the third fold and is connected to the third page by a second C-shaped strip of adhesive, thereby forming a second pocket. A cutout along the unglued and unfolded edge of the fourth page facilitates grasping a disc in the second pocket. One or more of these double-pocketed leaves can be assembled into any of the holders and booklets summarized above to provide additional pockets for holding discs.

While the embodiments of the invention described above are principally constructed of paper, the invention also includes compact disc holder/booklets including one or more pocketed leaves or panels constructed of heat sealable materials. As used herein, the term "heat sealable material" includes materials such as vinyl, thermoplastics, synthetic papers and non-woven synthetic fabrics which are at least partly constructed of heat-sealable fibers, and the like. Such heat sealable materials may be selectively fused by locally melting the materials together. For example, one such construction for a pocketed leaf includes pockets on opposed inner faces of the leaf. In this construction, a pocket panel has a fold line which divides the panel into first and second portions with front (inner) and rear (outer) faces. As used herein, the term "front" or "inner" means a surface facing the interior of the CD holder/booklet, while the term "rear" or "outer" means a surface facing the outside (i.e. the cover) of the holder/booklet. A first pocket is formed on the front face of the first portion of the pocket panel by a pocket sheet thermally fused to the front face along a substantially U-shaped or C-shaped seam. Similarly, a second pocket is formed on the front face of the second portion of the pocket panel by a second pocket sheet thermally fused to the front face along a substantially U-shaped or C-shaped seam. The first and second pockets include pocket openings at the open ends of the substantially C-shaped or U-shaped seam, and are shaped to receive and support compact discs. Preferably, the pocket sheets include notches or cutouts along the pocket openings to facilitate inserting or grasping a compact disc in the pocket.

In order to facilitate production and minimize the number of separate pieces comprising the pocketed leaf, the first and second pocket sheets may be connected together to form a continuous pocket sheet. In this arrangement, the continuous pocket sheet includes a central opening which forms the pocket openings in the pockets. The pocket panel and pocket sheets may be constructed of any compatible heat-sealable materials, such as vinyl, thermoplastics, or synthetic papers. Heat sealable synthetic papers which may be used may include polyethylene or polypropylene fibers or the like. Synthetic papers are desirable because they may be thermally fused together by a low-temperature ultrasonic bonding process, and they may be printed upon using many standard printing techniques.

In order to provide a soft, cushioned surface inside the pockets for protecting the optical sides of compact discs from scratches and dust or dirt, the pocket panel may include a layer of non-woven fabric. In this arrangement, the pocket panel may include a first layer constructed of heat sealable material such as vinyl or thermoplastic, and a second layer comprised of non-woven fabric adhered to the first layer. The non-woven fabric layer forms a protective inside surface in the first and second pockets. The non-woven fabric may be constructed of polyester or any other suitable fibers which provide a soft, protective surface.

The pocketed leaf summarized above may be used to form pockets on the inside surfaces of front and rear covers of a compact disc holder and booklet. In this arrangement, the, a paper cover includes a fold which divides the cover into a first cover panel and a second cover panel. The first and second cover panels each have an inside surface and an outside surface. At least one of the pocketed leaves is folded together with a booklet of paper pages, and the leaf and pages are sewn together along a central fold line. The pages are of substantially the same size and shape as the first and second panels of the cover. Rear faces of the outermost pocketed leaf are adhered to the inside surfaces of the first and second cover panels, thereby forming pockets on inside faces of the cover panels.

Alternatively, at least one of these pocketed leaves may be assembled in a holder/booklet to form at least two pocketed pages in the booklet. In this arrangement, a paper cover includes a fold which divides the cover into a first cover panel and a second cover panel. The first and second cover panels each have an inside surface and an outside surface. A fly sheet with a back face is stacked together with at least one of the pocketed leaves and a booklet of paper leaves. The fly sheet, the at least one pocketed leaf, and the booklet of paper leaves are stitched together along a central fold line. The back face of the fly sheet is adhered to the inside surfaces of the first and second cover panels. Multiple pocketed leaves may be included in such a holder/booklet for receiving and supporting a plurality of compact discs.

In yet another approach, a pocketed leaf is provided which includes pockets on both front and rear faces of the leaf. In this construction, two composite panels are provided which have substantially the same size and shape. The composite panels each include a first face comprised of heat sealable material, and a second face comprised of non-woven fabric. The composite panels are stacked with their first faces together. The stacked panels are divided into first and second pages by a fold line and the first and second pages each include a front face and a back face. The pocketed leaf also includes a plurality of heat sealable pocket sheets. At least one pocket sheet overlies each of the faces of the first and second pages. The stacked composite panels forming the first page and the pocket sheets overlying the first page are thermally fused together along a first U-shaped or C-shaped seam. Similarly, the stacked composite panels forming the second page and the pocket sheets overlying the second page are thermally fused together along a second U-shaped or C-shaped seam. Thus, pockets are formed on both faces of the first and second pages. These pockets each include a pocket opening proximate an open end of the C-shaped or U-shaped seam, and are suitably shaped to receive and support a compact disc. Preferably, each pocket sheet includes an elongated cutout proximate the pocket opening to facilitate grasping a compact disc in the pocket. A preferred elongated cutout extends from the pocket entrance opening to a central portion of the pocket sheet, so that the central hole of a CD in the pocket is exposed for grasping. Such a cutout permits a CD to be grasped with a thumb or finger in the CD hole while the CD is inserted or removed from the pocket. One or more of the pocketed leaves may be stitched together with a fly sheet and paper leaves to form compact disc holder/booklet similar to those described above.

These and other aspects of the present invention will become apparent to those skilled in the art after a reading of the following description of the preferred embodiments when considered with the drawings.

BRIEF DESCRIPTION OF THE DRAWINGS

FIGS. 2(a)–2(d) are perspective views illustrating a construction for the combination compact disc holder and informational booklet of FIGS. 1(a) and 1(b);

DETAILED DESCRIPTION OF THE PREFERRED EMBODIMENTS

Figure 1A:
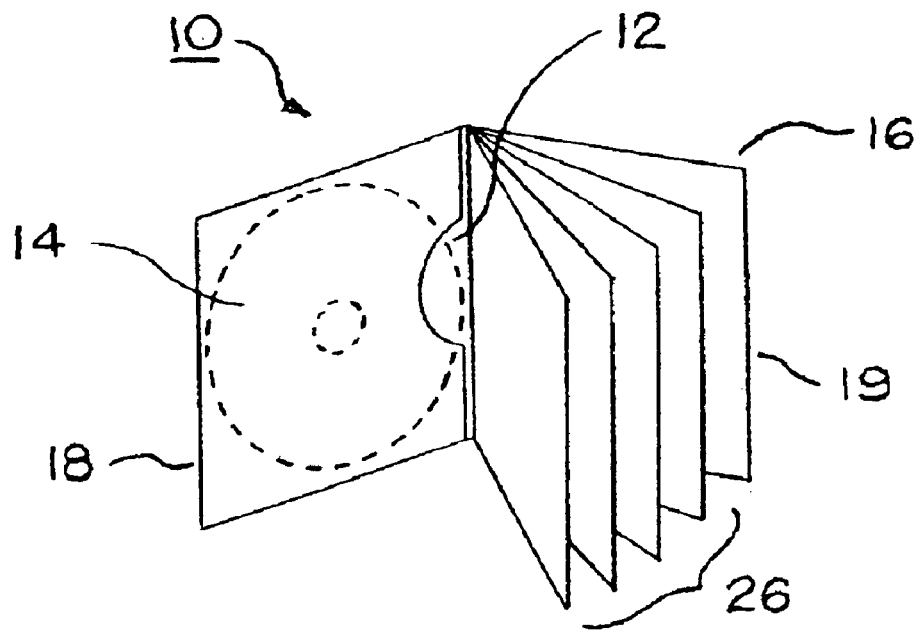
FIGS. 1(a) and 1(b) are environmental views of a combination compact disc holder and informational booklet according to the present invention.

In the following description, like reference characters designate like or corresponding parts throughout the several views. Also in the following description, it is to be understood that such terms as "first", "second", "outside", "inside", "top", "bottom", "side" and the like are words of convenience and are not to be construed as limiting terms.

Figure 1B:
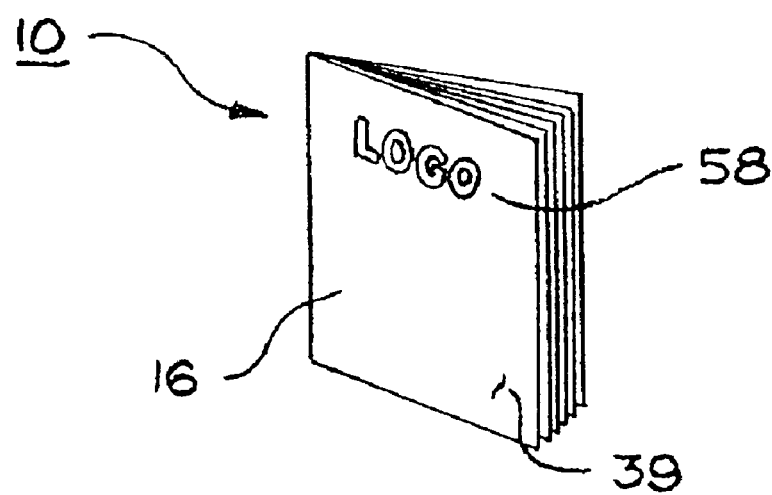

Referring now to the drawings in general and FIGS. 1(a) and 1(b) in particular, it will be understood that the illustrations are for the purpose of describing a preferred embodiment of the invention and are not intended to limit the invention thereto. FIGS. 1(a) and 1(b) illustrate a first embodiment 10 of a combination compact disc holder and informational booklet constructed in accordance with the present invention. The holder 10 has the general form of a booklet, and includes a cover 16 having an inside pocket 12 for holding a compact disc 14. The holder/booklet 10 folds to a compact size as shown in FIG. 1(b). Preferably, the holder/booklet 10 is about 5¼ inches wide by 5¼ inches tall when closed. The inward opening pocket 12 of the holder/booklet 10 is preferred because a compact disc 14 in the pocket is prevented from inadvertently falling or otherwise being dislodged from the pocket when the cover is closed. The holder/booklet 10 includes pages 26 for printed information about the disc 14. The holder/booklet 10 is preferably constructed entirely from paper and/or paperboard sheets that are substantially rectangular. The outer surfaces of the paper cover 16 may include a protective plastic coating 39.

A preferred construction for the holder/booklet shown in FIGS. 1(a) and 1(b) is illustrated in FIGS. 2(a) through 2(d). As seen in FIGS. 2(a) and 2(b), a plurality of paper leaves are stacked together as indicated by the arrows to form booklet 30. A first leaf or fly sheet 20 is divided by a central fold 21 into a front fly page 22 and a back fly page 24. The front fly page 22 is die cut to form a semi-circular edge 23 having a radius slightly greater than the radius of a compact disc. A second leaf 40 is divided by a fold 46 into a front page 42 and a rear page 44. The front page 42 includes an opening formed by cutout 49 and a narrow slit 48 that is itself parallel and closely adjacent to the fold 46. The length of the slit 48 is at least slightly greater than the diameter of a compact disc. The cutout 49 is included in the front page 42 along one side of the slit 48 away from the fold 46. One or more additional leaves 50 are provided which are divided by folds into additional pages 51.

As seen in FIG. 2(b), a booklet 30 is formed from the stacked leaves. The booklet 30 is bound along a fold line 32 by a stitched seam 34. As indicated by arrow "A" in FIG. 2(b), the booklet 30 is assembled to a cover 16. The cover 16 includes a fold 17 which divides the cover into a first panel 18 and a second panel 19. The inside surfaces of the cover 16 are flood coated with an adhesive layer 36. As best seen in FIG. 2(c), the back fly page 24 is glued to the inside surface of the second panel 19 by the adhesive layer 36. Also, the front fly page 22 is glued to the inside surface of the first panel 18 by the adhesive layer 36. Because the front fly page 22 is smaller than the first panel 18, a C-shaped strip of adhesive 38 is left uncovered by the front fly page 22.

The slotted front page 42 is attached to the first panel 18 as indicated by arrow "B" in FIG. 2(c). As shown in FIG. 2(d), the slotted front page 42 is glued to the first panel 18 by the C-shaped strip of adhesive 38, thereby forming a pocket 52. The semicircular shape of the adhesive strip shown in FIG. 2(c) causes the pocket 52 to have a semicircular bottom for closely supporting a compact disc 14 inserted into the pocket 52 through the slit 48. Alternatively, the C-shaped adhesive strip 38 may have a square-like shape like that shown in FIG. 3(c) to form a square bottom in the pocket 52. The cutout 49 along the slit 48 permits a person to more easily grasp a compact disc 14 in the pocket 52. The cutout 49 may be shaped as shown in FIG. 2d, an arcuate shape like cutout 49 in FIG. 3(c), or any other suitable shape. The additional pages 51 contain printed information about the content of the compact disc 14. The stitched seam 34 of the booklet 30 is hidden along the spine of the holder/booklet by the cover 16, thereby providing a finished, high-quality outer appearance. Therefore, no staples are used in the construction of the holder/booklet 10 and no staples are exposed along the spine of the holder/booklet.

The glue which is flooded onto the inner surfaces of the first and second panels 18, 19 comprises a resin emulsion adhesive (Evans No. 04053, Evans Adhesive Corp., Columbus, Ohio). The composition of Evans No. 04053 is a vinyl acetate ethylene copolymer emulsion. The adhesive may include other additives, for example, a defoamer. The copolymer emulsion is water-based and contains approximately 45% water, and the vinyl acetate ethylene copolymer emulsion content is approximately >95.0 wt. %. It is contemplated that any comparable adhesive may be used as to form the glue strip 38.

Figure 3A:
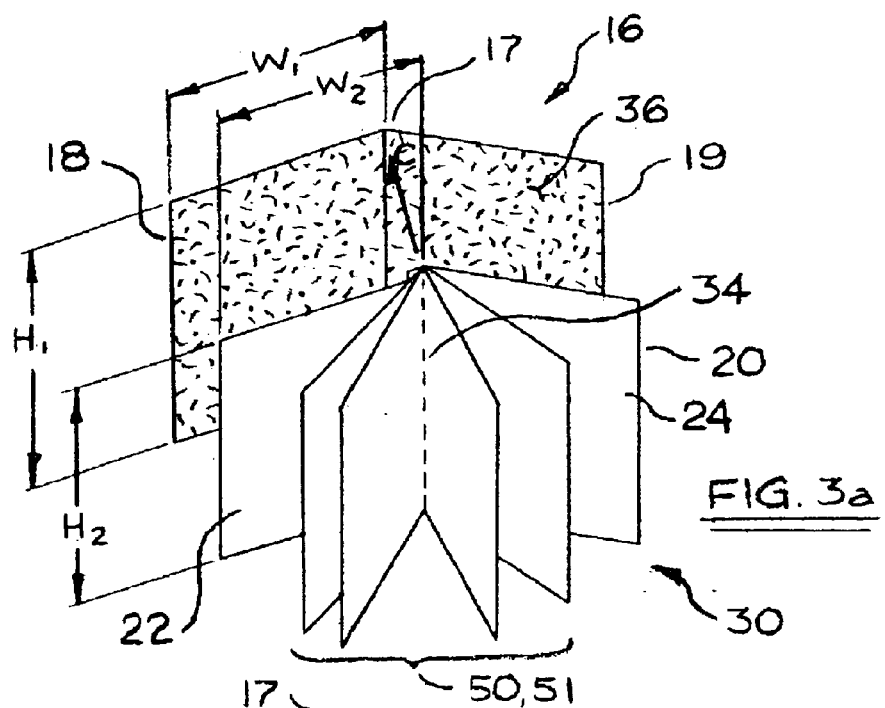
FIGS. 3(a)–3(c) are perspective views illustrating another construction for the combination compact disc holder and informational booklet of FIGS. 1(a) and 1(b)
Figure 3B:
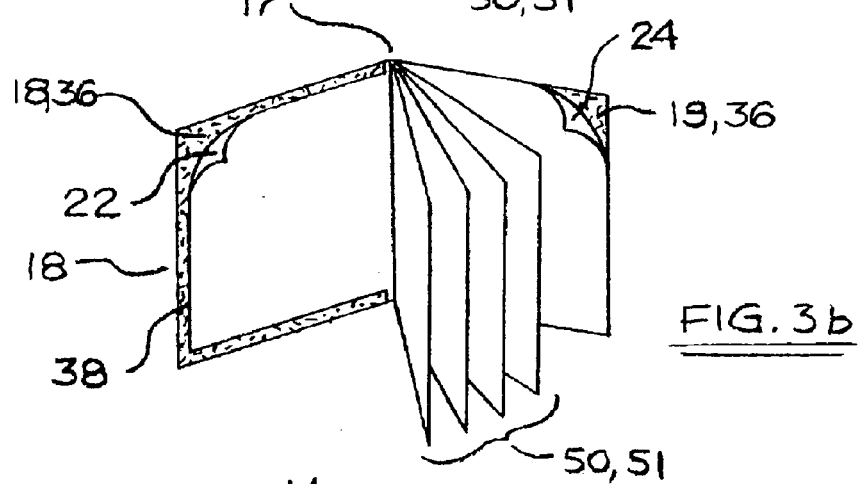
Figure 3C:
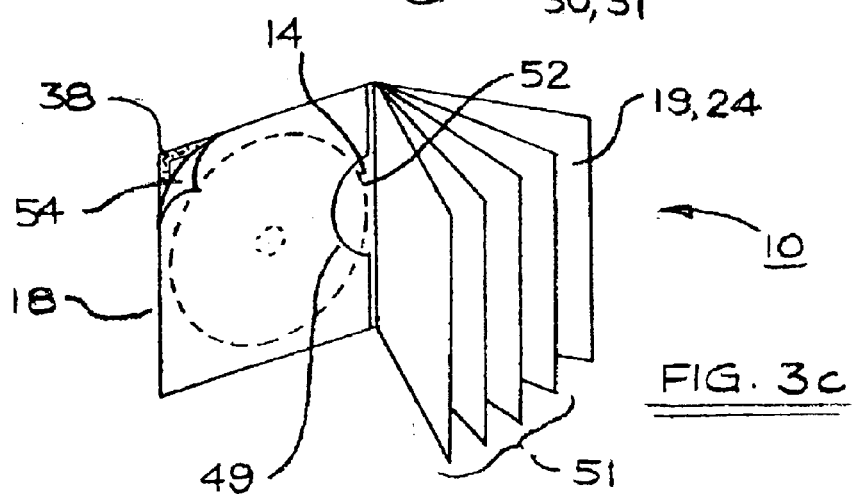

FIGS. 3(a)–3(c) illustrate a second construction of the combination compact disc holder and informational booklet 10 in accordance with the present invention. The holder 10 includes a cover 16. The cover 12 is folded in half at the fold 17 which divides the cover 16 into a first panel 18 and a second panel 19. A booklet 30 has a stitched seam 34 connecting a fly sheet 20 to additional leaves 50. The fly sheet 20 includes a front fly page 22 and a back fly page 24. The front fly page 22 has a width $W_2$ and height $H_2$. The width $W_2$ and height $H_2$ are respectively narrower and shorter than the width $W_1$ and height $H_1$ of the first panel 18. The inside surfaces of the cover 16 are flood coated with an adhesive layer 36, and the booklet 30 is assembled to the cover 16 as indicated by arrow "C" in FIG. 3(a).

The front fly page 22 is glued to the first panel 18 as seen in FIG. 3(b). The back fly panel 24 is similarly glued to the second panel 19. The narrower and shorter front fly page 22 leaves a portion of the adhesive 36 on the first panel uncovered, thereby forming a C-shaped strip of adhesive 38. Preferably, the adhesive strip has a width between about one-eighth inch and about one-quarter inch. As seen in FIG. 3(c), a separate pocket sheet 54 is attached to the inside of the first cover panel 18 by the C-shaped adhesive strip 38, thereby forming a pocket 52. The pocket 52 preferably is square and is sized to receive and retain a compact disc 14 as shown. The edge of the separate pocket sheet 54 adjacent to the fold of the booklet includes a cutout 49 to facilitate grasping a compact disc 14 in the pocket 52. The cutout 49 may have an arcuate shape as shown, or any other suitable shape that facilitates grasping a disc 14 in the pocket 52. The additional pages 51 are used to print information about the content of the compact disc 14.

Figure 4A:
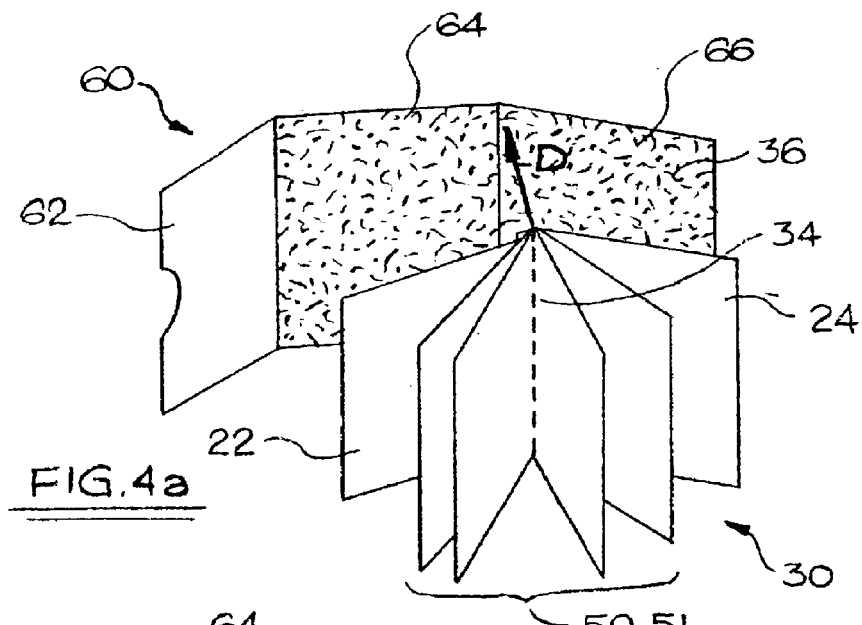
FIGS. 4(a)–4(c) are perspective views illustrating a third construction of the combination compact disc holder and informational booklet of FIGS. 1(a) and 1(b)
Figure 4B:
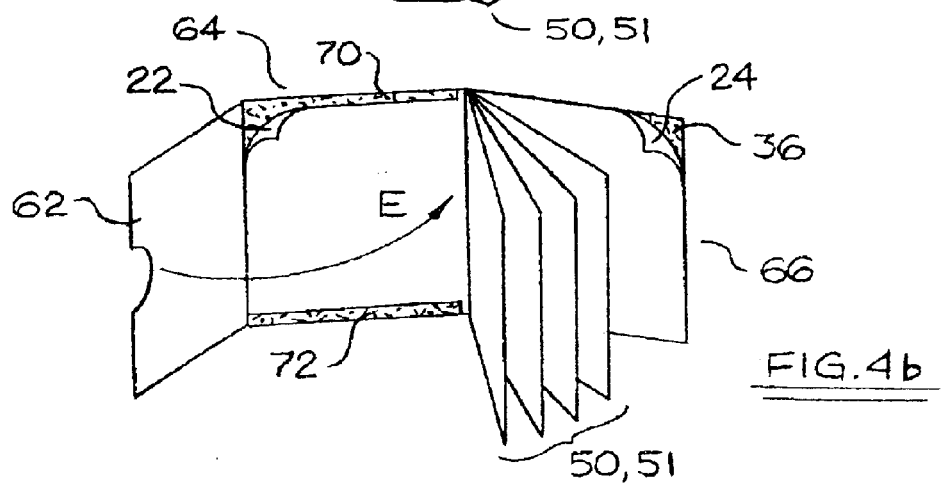
Figure 4C:
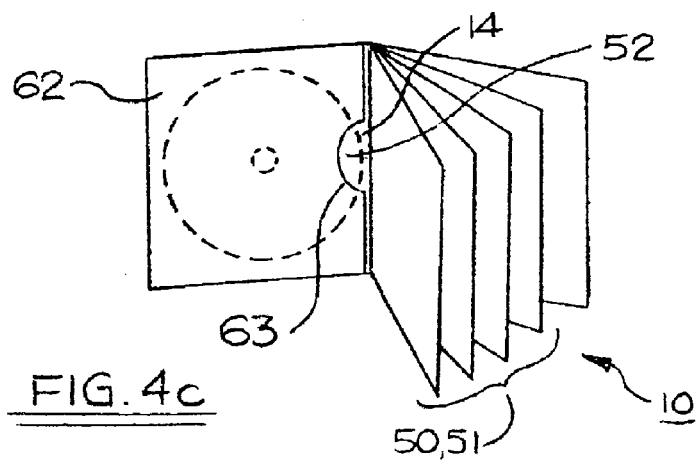

FIGS. 4(a)–4(b) illustrate another construction for the holder/booklet 10 shown in FIGS. 1(a) and 1(b). In this construction, the cover 60 includes a front panel 62, a middle panel 64, and a rear panel 66. A booklet 30 like that described above is attached to the middle panel 64 and rear panel 66 as indicated by arrow "D." The booklet 30 is attached by a flood coated adhesive layer 36 on the inside surfaces of the middle and rear panels 64, 66. As seen in FIG. 4(b), the front fly page 22 is glued to the middle panel 64 and a back fly page 24 is glued to the rear panel 66. The front fly page 22 is sized to leave a top adhesive strip 70 and bottom adhesive strip 72 exposed along top and bottom edges of the middle panel 64. The front panel 62 is folded against the middle panel 64 as indicated by arrow "E" in FIG. 4(b). As best seen in FIG. 4(c), the front panel 62 is glued to the middle panel 64 by the adhesive strips 70, 72, thereby forming the pocket 52 for a compact disc 14. The side edge of the front panel 62 includes a cutout 63 to facilitate grasping a disc 14 in the pocket 52.

In each of the various constructions of holder/booklet 10 described above, the adhesive strips used to form the pocket 52 are formed by flood coating inside surfaces of the cover panels with an adhesive layer and overlaying a fly sheet that leaves adhesive strips uncovered. Alternatively, the fly sheets 20 and fly pages 22, 24 may be omitted altogether, and the adhesive strips may be applied directly to the cover panels only in the desired areas of the cover panels. The strips of adhesive may be applied to the cover panels by rolling, screening, or any other suitable means.

Also, each of the embodiments described above includes a single pocket 52 on the inside of one of the two cover panels. Alternatively, a second pocket (not shown) may also be formed on the second cover panel in the same manner as the first pocket.

Figure 5A:
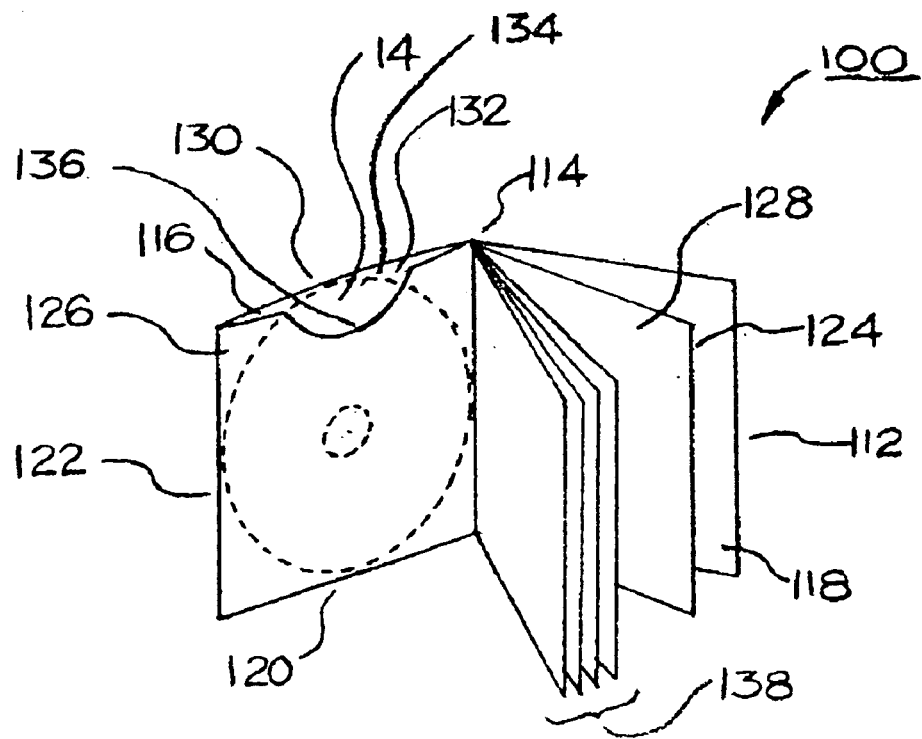
FIGS. 5(a) and 5(b) are perspective views illustrating another embodiment of a combination compact disc holder and informational booklet according to the present invention.
Figure 5B:
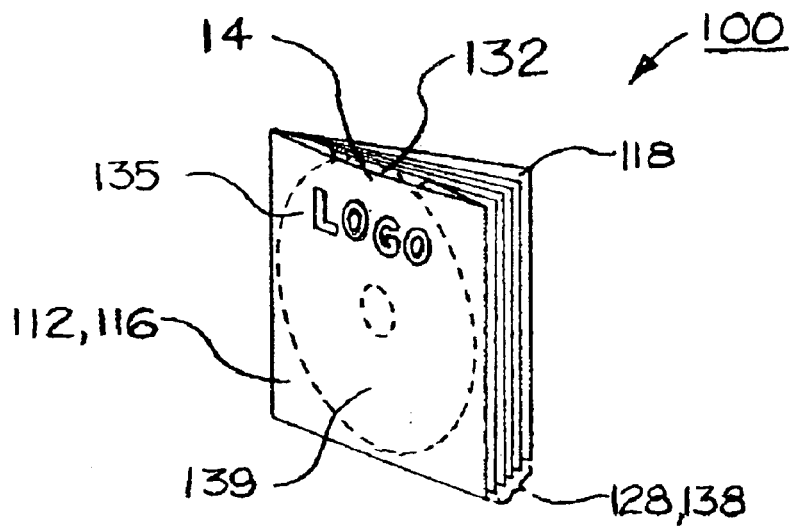
Figure 6A:
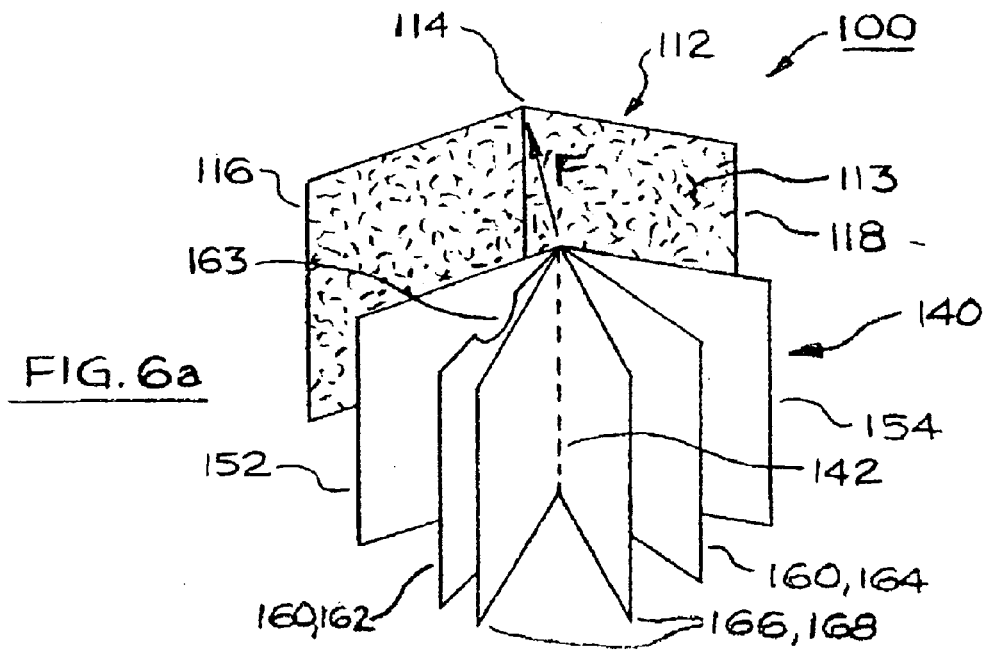
FIGS. 6(a)–6(c) are perspective views showing a construction for the combination compact disc holder and informational booklet of FIGS. 5(a)–5(c)
Figure 6B:
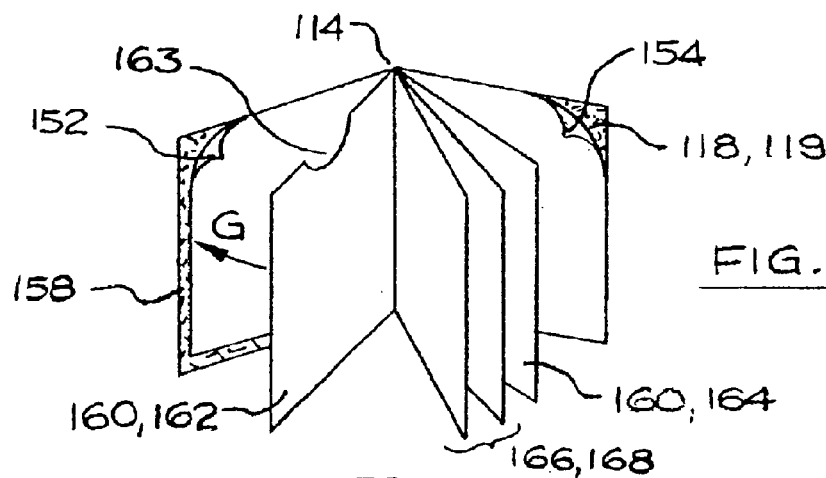

FIGS. 5(a) and 5(b) generally illustrate another embodiment 100 of a compact disc holder and booklet according to the present invention. In this embodiment, the pocket 132 has a pocket opening 134 along an upper edge 130 of the front cover panel 116. FIGS. 6(a)–6(b) illustrate one construction for the holder booklet 100. As seen in FIG. 6(a), a booklet 140 includes a fly leaf 150 having a front fly page 152 and a back fly page 154. A second leaf 160 includes a pocket page 162 and a last page 164. The upper edge of the pocket page 162 includes a cutout 163. The booklet 140 also includes one or more additional leaves 166 including additional pages 168. The leaves forming the booklet 140 are connected by a stitched seam 142 along a central fold.

The holder booklet 100 also includes a cover 112. A central fold 114 divides the cover into a front cover panel 116 and a back cover panel 118. The inside surfaces of the cover 112 are flood coated with an adhesive layer 113. The booklet 140 is assembled to the cover 112 as indicated by arrow "F" in FIG. 6(a).

Referring to FIG. 6(b), the front fly page 152 is glued to the inside surface of the front cover panel 116 by the adhesive layer 113. Because the front fly page is smaller than the front cover panel 116, a portion of the adhesive 113 is not covered by the front fly page 152, thereby forming an L-shaped strip of adhesive 158 as shown in FIG. 6(b). The back fly page 154 is glued to the back cover panel 118. The pocket page 162 is laid against the front cover panel 116 and front fly page 152 as indicated by arrow "G" in FIG. 6(b).

Figure 6C:
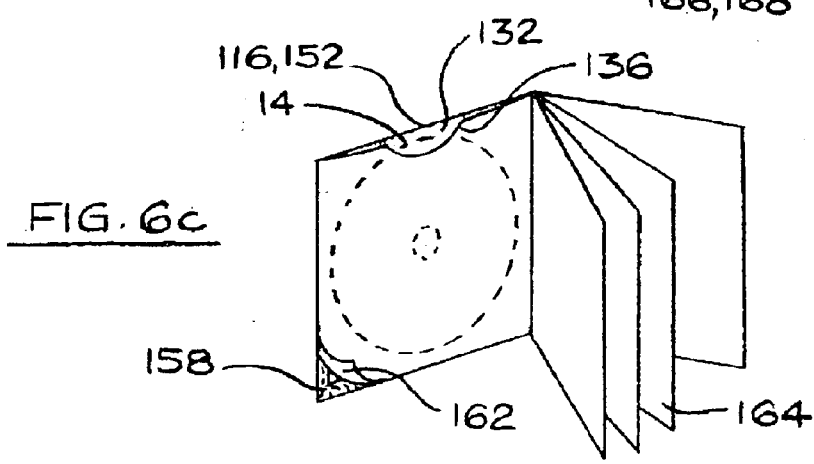

As seen in FIG. 6(c), the pocket page 162 is glued to the front cover panel 116 by the L-shaped adhesive strip 158, thereby forming a pocket 132. The cutout 136 facilitates grasping a disc 14 in the pocket 132. The last page 164, and the additional pages 138 can be used to print information about a disc 14 in the pocket. Of course, the pocket 132 could be likewise constructed on the back cover panel 118 instead of on the front cover panel 116. Similarly, a first pocket may be located on the front cover panel 116 and a likewise constructed second pocket located on the back cover panel 118 (not shown).

Figure 7A:
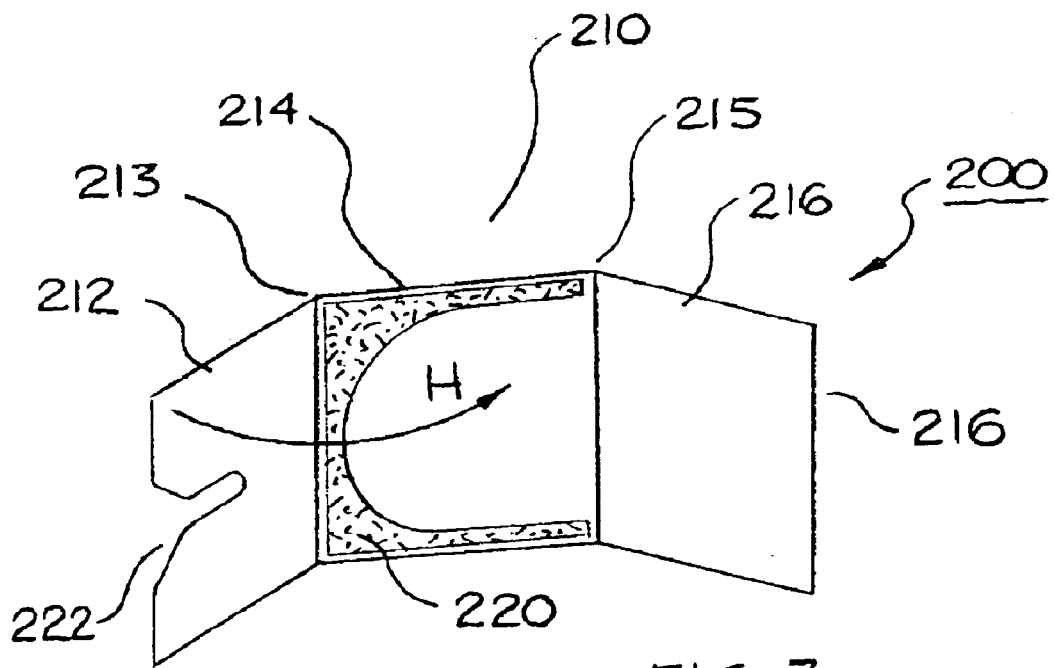
FIGS. 7(a) and 7(b) are perspective views illustrating a construction for a leaf having a pocket for inclusion in a combination compact disc holder and informational booklet according to the present invention.
Figure 7B:
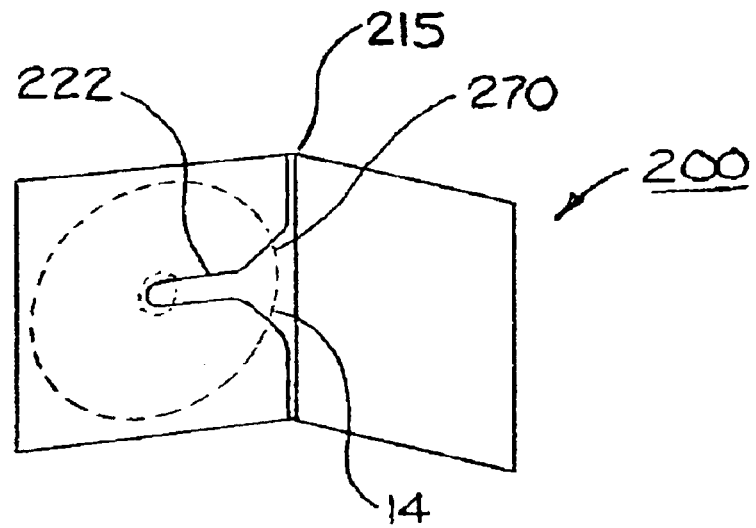

Because it may be desirable to include more than one or two pockets for compact discs in a CD holder/booklet, the invention also includes a pocketed leaf 200 as shown in FIGS. 7(a) and 7(b). One or more of these pocketed leafs 200 may be included in the booklets 30 or 140 of the holder/booklets described above. As seen in FIG. 7(a), each pocketed leaf 200 includes a sheet 210 that has a first panel 212, a first fold 213, a second panel 214, a second fold, 215, and a third panel 216. An outer edge of the first panel includes a cutout 222. A C-shaped adhesive strip 220 is screened or otherwise applied on the inside surface of the second panel 214 as shown. The first panel 212 is folded against the second panel as indicated by arrow "H" in FIG. 7(a) and is adhered thereto by the adhesive strip 220. As seen in FIG. 7(b), a pocket 270 is formed for receiving a compact disc 14. The cutout 222 facilitates grasping a disc 14 in the pocket 270. The pocketed leaf 200 may be included in a booklet 30 or 140 in the holder/booklets 10, 100 described above and stitched with the other leaves in the booklet along the fold 215.

Figure 8A:
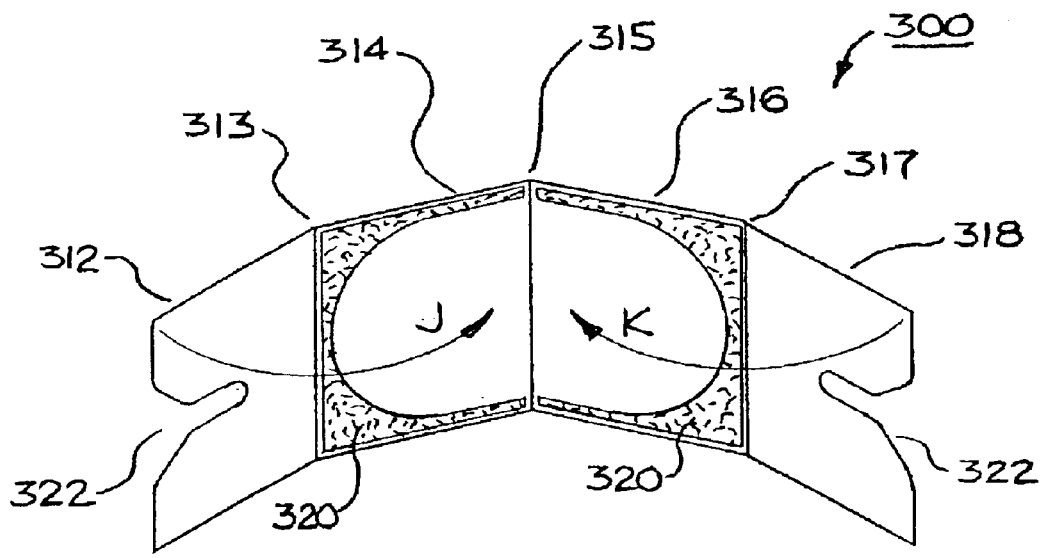
FIGS. 8(a) and 8(b) are perspective views illustrating a construction for a leaf having a front pocket and a rear pocket.
Figure 8B:
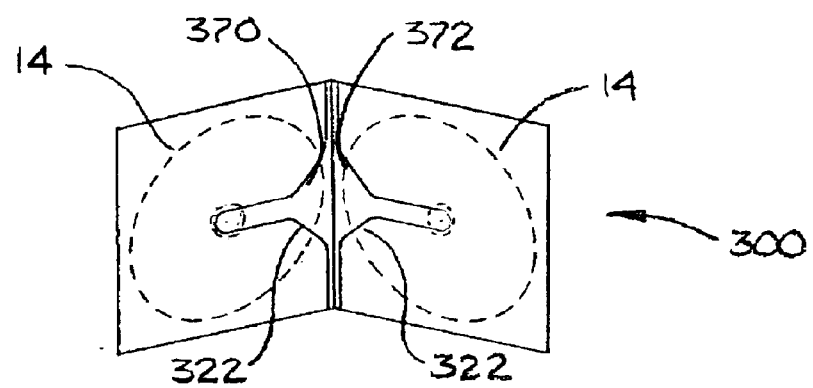

FIGS. 8(a) and 8(b) illustrate another embodiment 300 of a pocketed leaf for inclusion in a booklet 30 or 140. In this embodiment, two pockets 370, 372 are provided. As seen in FIG. 8(a), the pocketed leaf 300 includes a sheet 310 that has a first panel 312, a first fold 313, a second panel 314, a second fold, 315, a third panel 316, a third fold 317, and a last panel 318. Outer edges of the first and last panels 312, 318 include cutouts 322 as shown. A C-shaped adhesive strip 320 is applied to the inside surfaces of both the second panel 314 and third panel 316 as shown. The first panel 312 is folded against the second panel as indicated by arrow "J" in FIG. 8(a) and is adhered thereto by the adhesive strip 320. Similarly, the last panel 318 is folded against the third panel 316 as indicated by arrow "K" and is adhered thereto by adhesive strip 320. As seen in FIG. 8(b), two pockets 370, 372 are formed for receiving compact discs 14. The cutouts 322 facilitate grasping discs 14 in the pockets 370, 372. The pocketed leaf 300 may be included in a booklet 30 or 140 in the holder/booklets 10, 100 described above and stitched with the other leaves in the booklet along the fold 315.

The adhesives used to assemble the various embodiments of the invention disclosed above are set by pressing the assembled holders/booklets in a flat state. Preferably, the stacked and adhered leaves and cover are squeezed together in an air-powered vise which sets the adhesive between adjacent panels/pages. Each time, the vise is squeezed under approximately 2800 lbs/in. of pressure for a sufficient amount of time in which to properly seal the adhesive. The pressure may range between about 2000 and 4000 lbs/in. In a preferred embodiment, the vise may be squeezed between about 30 seconds and about one minute, respectively.

Figure 9A:
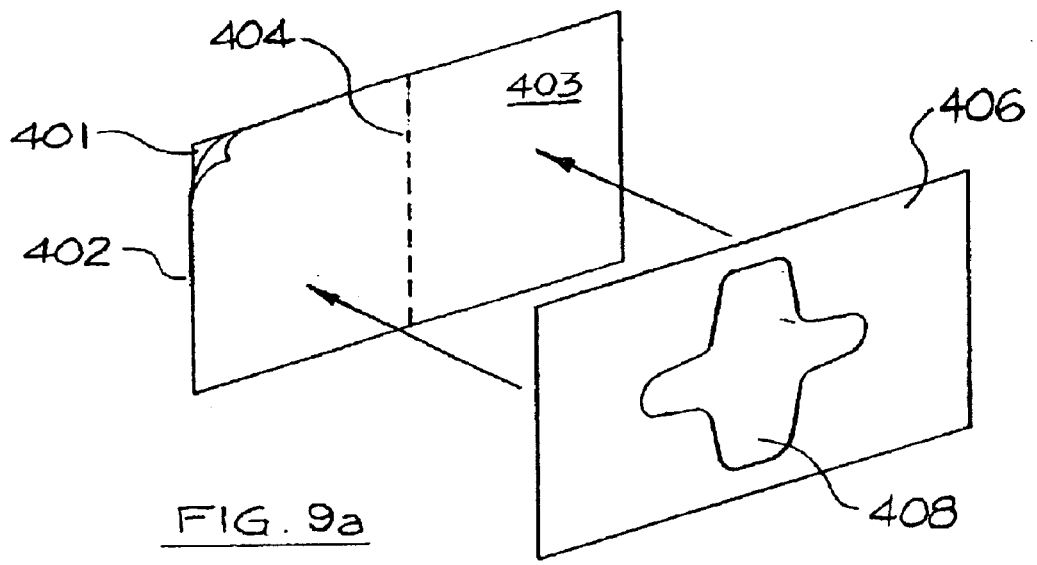
FIGS. 9(a)–9(c) are perspective views of a construction for a double-pocketed leaf for a holder/booklet having pockets on opposed pages of the leaf.
Figure 9B:
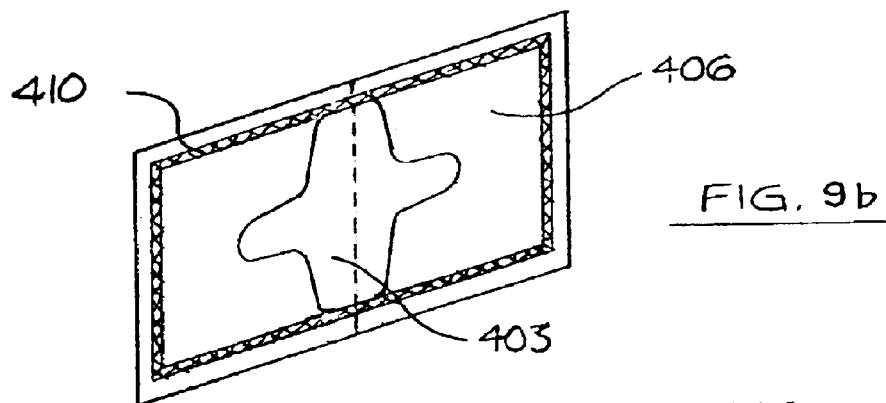
Figure 9C:
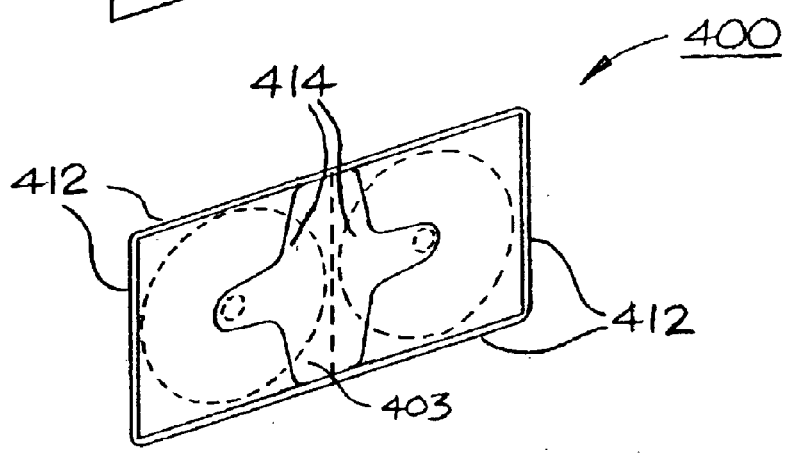

While the embodiments described above are principally constructed of paper and/or paperboard, the invention also includes CD holder/booklets constructed in part with other, non-paper materials. For example, FIGS. 9(a)–9(c) illustrate a construction of a double-pocketed leaf for a holder/booklet that can be produced from paper or paperboard, but which also can be constructed of non-paper substrates. Such non-paper substrates may be constructed of heat sealable materials such as vinyl, thermoplastics, synthetic papers, or synthetic non-woven fabrics. The term "synthetic paper" as used herein is defined as paper that is constructed of synthetic furnishes or fibers which may be printed upon using conventional printing techniques. The term "non-woven fabric" as used herein is defined as a manufactured sheet of fibers bonded together by friction and/or cohesion and/or adhesion, excluding paper and products which are woven, knitted, stitchbonded incorporating binding yams or filaments, or felted by wet-milling. One advantage provided by such heat sealable substrates is they can be fused together by locally-applied heat rather than with applied adhesives.

A pocketed leaf construction 400 which uses heat to selectively fuse component sheets together will be described with reference to FIGS. 9(a)–9(c). As seen best in FIG. 9(a), panel 402 includes a fold line 404, a first side 401, and a second side 403. The panel 402 may be constructed of vinyl or any other suitable heat-fusible material such as thermoplastics. Pocket sheet 406 is also preferably constructed of vinyl or thermoplastic, and includes a cutout 408. Cutout 408 preferably is shaped as shown, but other functional cutout shapes may also be used. Pocket sheet 406 is placed against panel 402 as indicated by the arrows of FIG. 9(a). Referring now to FIG. 9(b), pocket sheet 406 and panel 402 are fused together by applying a controlled amount of heat along fusing region 410. The heat applied in fusing region 410 causes local portions of panel 402 and sheet 406 to melt together, thereby fusing the sheets together in this region as the melted materials cool. As shown in FIG. 9(c), the margins of the fused sheets may be trimmed to provide finished edges 412. Non-fused regions between joined panel 402 and sheet 406 form two opposed pockets 414 which are sized and shaped to receive CD's. The lobes of cutout 408 as shown 9in FIGS. 9(a)–9(c) provide thumb/finger notches which facilitate grasping CD's in the pockets.

The heat for fusing panel 402 to pocket sheet 406 may be applied by pressing the leaf and sheet together between suitably configured heated dies. Alternatively, the panel 402 and sheet 406 may be fused together using dielectric heat sealing equipment. Such equipment is commonly used in the packaging industry. Dielectric heat sealing is accomplished by sending a high frequency current through the adjacent layers of heat sealable materials pressed between two sealing electrodes or dies. The high frequency energy produces localized heating of the materials, causing them to soften and melt. The current is shut off, and the materials fuse together as the materials cool. Dielectric sealing is generally easier to control than sealing with conventionally heated dies.

In yet another method of fusing pocket sheet 406 to panel 402, ultrasonic bonding may be used. Like dielectric sealing, ultrasonic bonding is commonly used in the packaging industry. In this approach, the materials to be fused together are pressed between suitably configured dies. These dies are subjected to ultrasonic oscillations (in a range between about 16 kHz and 1 GHz). The oscillations of the dies develop local heat friction in the panel 402 and sheet 406 in the pressed fusing region 410. As heat builds up, the heat sealable substrates melt and fuse together as they subsequently cool. One advantage of ultrasonic bonding is that it permits panel 402 and/or pocket sheet 406 to be constructed of synthetic papers constructed of polypropylene, polyethylene, or other heat sealable fibers. Unlike vinyl or other heat-sealable thermoplastic materials, such synthetic papers are more compatible with conventional printing techniques.

In a preferred embodiment, panel 402 is formed of a composite sheet having two layers: a vinyl or thermoplastic layer 401 on the outside, and a non-woven fabric layer 403 on the inside. Preferably, the non-woven fabric layer is constructed of polyester fibers. The non-woven fabric layer 403 provides a smooth, soft surface on second side 403. Alternatively, the non-woven fabric layer may be constructed of polypropylene fibers, or any other suitable synthetic fibers which are heat sealable and provide a similarly soft, smooth surface on the inside surface of panel 402. This soft surface provides a cushion for the optical side of CD's placed in the pockets 414. The non-woven fabric layer 403 does not interfere with the heat sealing of the pocket sheet 406 to the vinyl or thermoplastic layer 401 underlying the non-woven fabric.

Figure 10A:
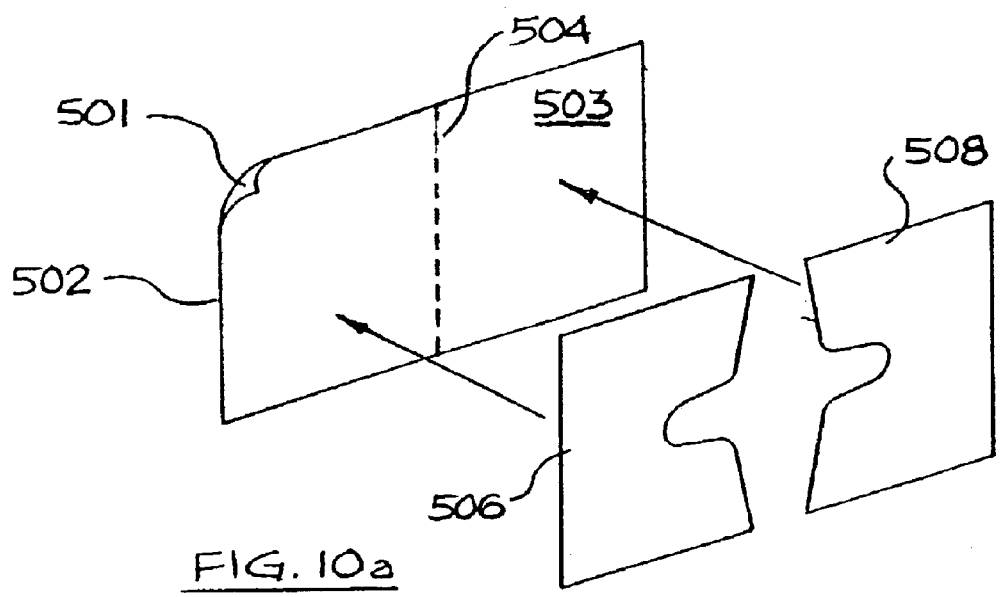
FIGS. 10(a)–10(c) are perspective views of an alternate construction for double-pocketed leaf similar to that of FIGS. 9(a)–9(c)
Figure 10B:
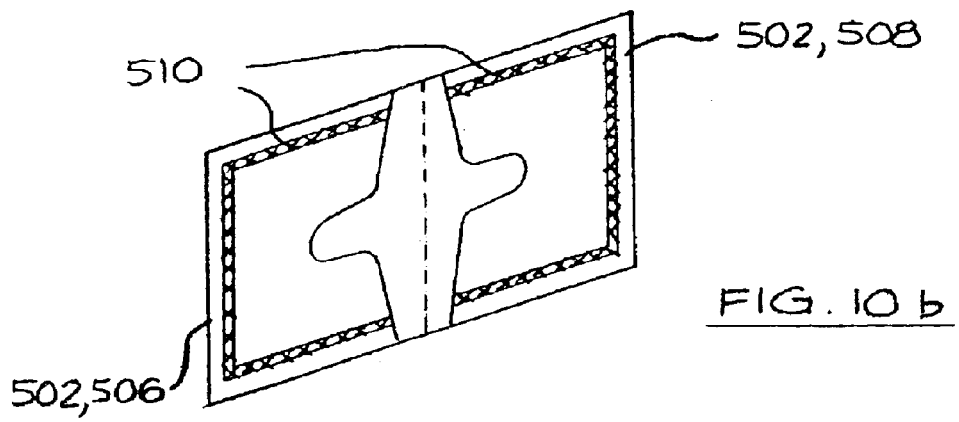
Figure 10C:
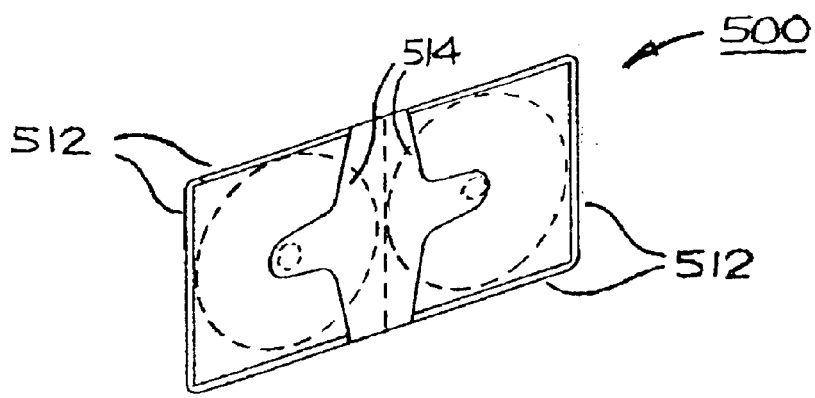

FIGS. 10(a)–10(c) illustrate an alternate construction for a double-pocketed leaf 500 for a CD holder/booklet which is similar to the construction illustrated in FIGS. 9(a)–9(c) and described above. In this embodiment, two separate pocket sheets 506, 508 are used to form pockets on panel 502. Otherwise, the construction is essentially the same as leaf 400 described above. In addition, the same materials and construction methods described above regarding leaf 400 may be employed in the construction of double-pocketed leaf 500. As shown in FIG. 10(b), pocket sheets 506 and 508 are adhered to opposed ends of panel 502 along fusing regions 510. The pocket sheets 506, 508 may be adhered with strips of adhesive, or may be fused thermally, dielectrically sealed, or ultrasonically bonded to panel 502. Panel 502 may include a vinyl or thermoplastic layer 501 on the outside and a non-woven fabric layer 503 on the inside. Where ultrasonic bonding is used, panel 502 and pocket sheets 506, 508 may be constructed of synthetic papers as described above. As shown in FIG. 10(c), edges 512 may be trimmed to provide a finished border around leaf 500. The pockets formed on leaf 500 are sized and shaped to receive compact discs 514. Preferably, elongated slots are provided in pocket sheets 506, 508 along the pocket openings to facilitate grasping or placing CD's in the pockets.

Figure 11A:
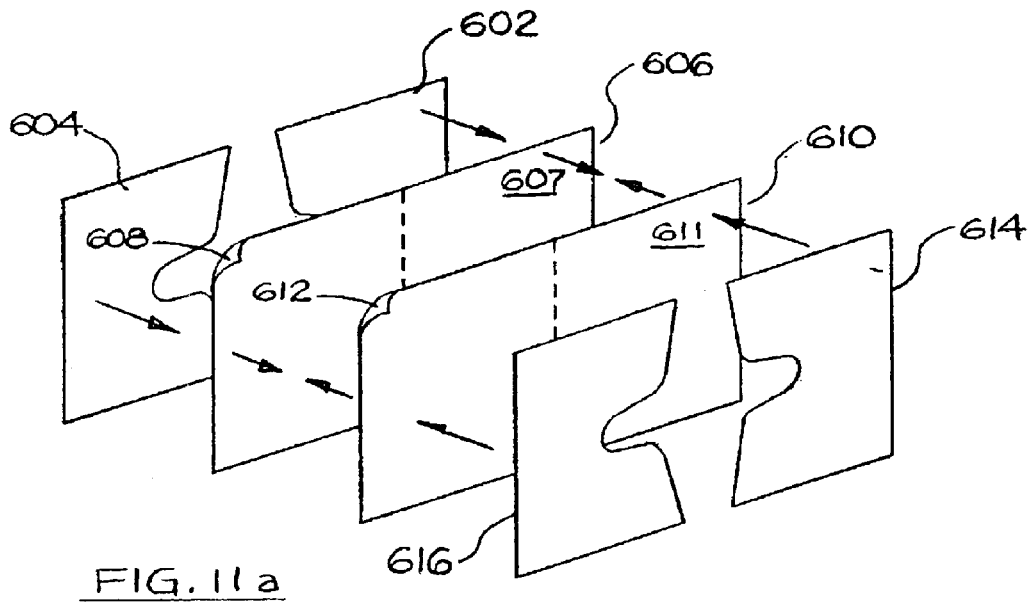
FIGS. 11(a)–11(c) are perspective views of construction for a leaf for a holder/booklet, the leaf including pockets on both front and rear sides of the opposed pages of the leaf.
Figure 11B:
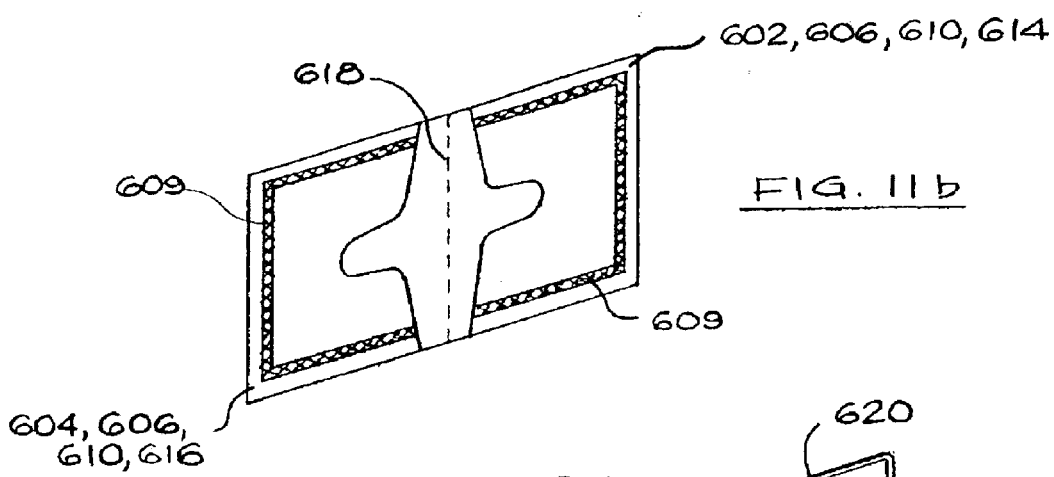
Figure 11C:
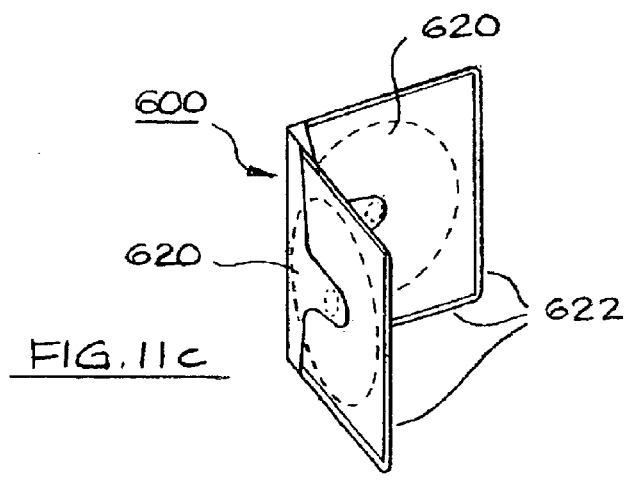

As shown in FIGS. 11(a)–11(c), the invention also includes a leaf 600 for a CD holder/booklet, wherein leaf 600 includes two pockets on opposed ends of both front and back sides of the leaf. As seen in FIG. 11(a), this construction includes a first pocket panel 606 and a second pocket panel 610. Pocket panels 606 and 610 each include a pocket-receiving side 608, 611 and a back side 607, 612. Pocket panels 606, 610 are stacked together with pocket sheets 602, 604, 614, 616 as indicated by the arrows in FIG. 11(a). As shown in FIG. 11(b), this stack is adhered or fused together along fusion regions 609. The preferred materials for pocket panels 606, 610 and pocket sheets 602, 604, 614, 616 are the same as described above for pocketed leaves 400, 500. The stack may be adhered together with adhesive strips, thermally sealed, or ultrasonically bonded in fusing regions 609. Pocket panel 606 may include a vinyl or thermoplastic layer 607 on its back side, and a non-woven fabric layer 608 on its pocket-receiving side. Similarly, pocket panel 610 may include a vinyl or thermoplastic layer 612 on its back side, and a non-woven fabric layer 611 on its pocket-receiving side 611. Pocket sheets 602 and 604 and pocket sheets 614 and 616 may be connected together to form single pocket sheets having central cutouts like pocket sheet 406 and cutout 408 as shown in FIG. 9(a). Where ultrasonic bonding is used to bond the stack together in fusing regions 609, panels 606, 610 and pocket sheets 602, 604, 614, 616 may be constructed of heat sealable synthetic papers as described previously. As shown in FIG. 11(c), edges 622 may be trimmed to provide a finished border around leaf 600. The pockets formed on each side of leaf 600 are sized and shaped to receive compact discs 620. Preferably, elongated slots are provided in pocket sheets 602, 604, 614, 616 along the pocket openings to facilitate grasping or placing CD's in the pockets.

Figure 12A:
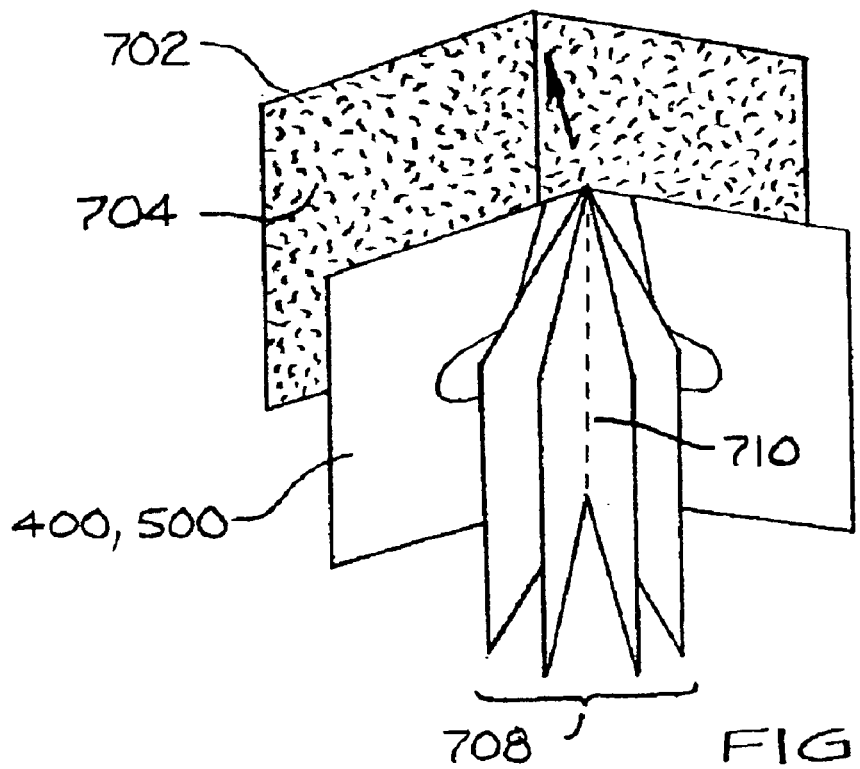
FIGS. 12(a) and 12(b) are perspective views of a construction for a holder/booklet constructed using a double-pocketed leaf like that of either FIGS. 9(c) or 10(c)
Figure 12B:
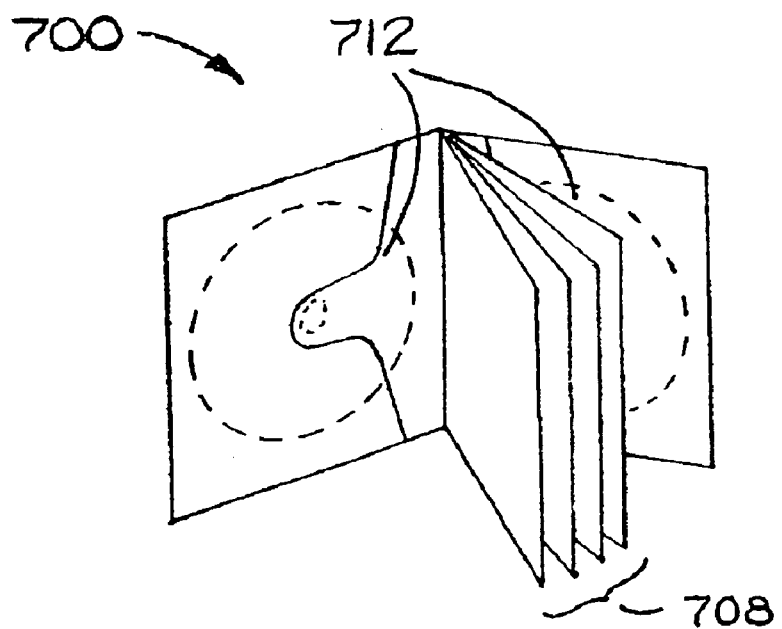

FIGS. 12(a) and 12(b) illustrate a construction for a CD holder booklet including pocketed leaves 400 or 500 described above. The booklet includes a cover panel 702, at least one pocketed leaf 400, 500, and a plurality of pages 708. Pages 708 are stitched to the at least one pocketed leaf 400, 500 along seam 710. An inner surface 704 is preferably flood coated with a suitable adhesive. Pocketed leaf 400, 500 is adhered to inner surface 704 of cover panel 702 as indicated by the arrow in FIG. 12(a). The completed holder/booklet shown in FIG. 12(b) includes pockets 712 on front and back inside surfaces of the holder/booklet cover. Pages 708 may be printed with information regarding the content of CD's received in pockets 712.

Figure 13:
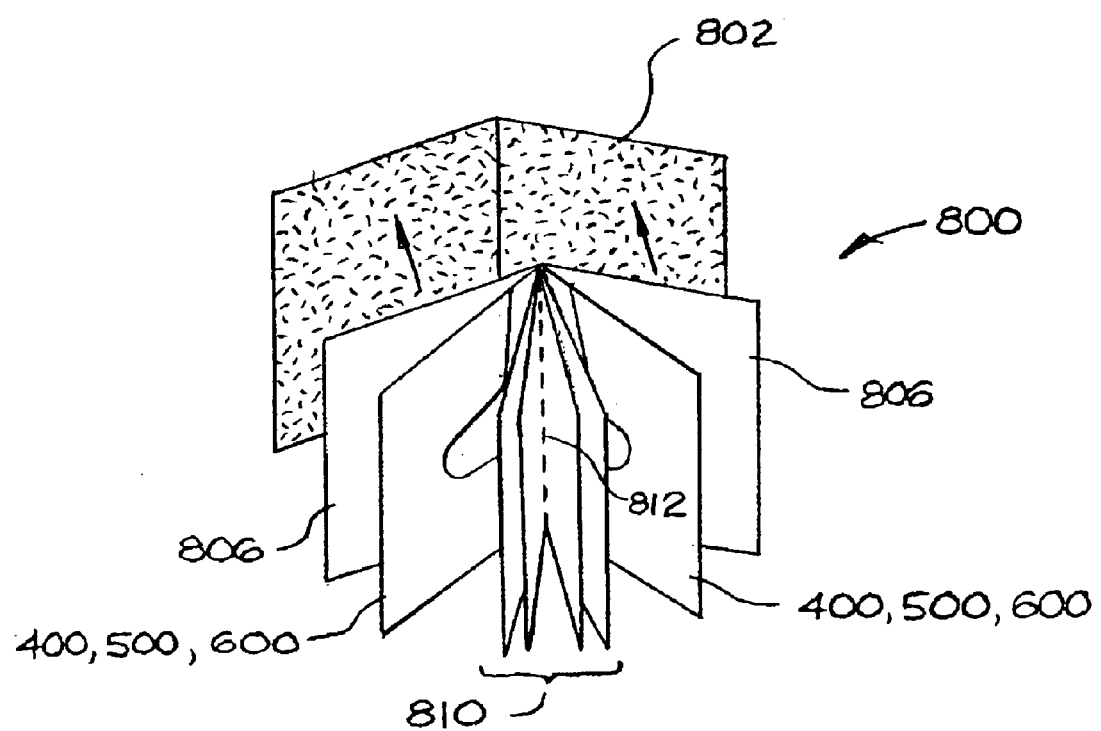
FIG. 13 is a perspective view of a construction for a holder/booklet including a pocketed leaf like that of FIGS. 9(c), 10(c), or 11(c).

FIG. 13 illustrates a construction for a CD holder booklet constructed using one or more pocketed leaves 400, 500, or 600 described above. This construction includes a cover panel 802, a fly panel 806, at least one pocketed leaf 400, 500, 600, and a plurality of pages 810. Fly panel 806, the at least one pocketed leaf 400, 500, 600, and pages 810 are stitched together at seam 812 as shown. Fly panel 806 is adhered to an inside surface of cover 802 by a flood coated adhesive.

While this invention has been illustrated and described in accordance with preferred embodiments, it is recognized that variations and changes may be made therein without departing from the invention as set forth in the claims.

Certain modifications and improvements will occur to those skilled in the art upon a reading of the forgoing description. By way of example, it is contemplated that the combination compact disc holder and booklet of the present invention can be modified or adapted for use with other storage media such as digital video discs or other similar optical discs or the like. It should be understood that all such modifications are not contained herein for the sake of conciseness and readability, but are properly within the scope of the following claims.

What is claimed is:

1. A pocketed leaf for a combination compact disc holder and informational booklet comprising:
    (a) a pocket panel including a fold line dividing the panel into a first portion and a second portion, the first and second portions each including an inner and an outer face; and
    (b) a continuous pocket sheet having a first pocket portion and a second pocket portion and a central opening therebetween, the first rocket portion being thermally fused along a seam line to the inner face of first portion of the pocket panel to form a first pocket, and the second pocket portion being thermally fused along a seam line to the inner face of the second portion of the pocket panel to form a second pocket;
    (c) wherein the pocket sheet and pocket panel are at least partially formed of a heat sealable material;
    (d) the central opening providing a first an entrance opening between the first portion of the pocket panel and the first pocket portion of the pocket sheet and a second entrance opening between the second portion of the pocket panel and the second pocket portion of the pocket sheet, the first and second pockets each being of such size and shape as to receive and retain a compact disc therein.

2. A pocketed leaf according to claim 1 wherein the pocket sheet includes a first elongated cutout along a first edge proximate the first pocket entrance opening and a second elongated cutout along a second edge proximate the second pocket entrance opening, the first and second cutouts in the pocket sheet being sized and shaped to facilitate grasping a compact disc for removal from the first and second pockets.

3. A pocketed leaf according to claim 1 wherein the pocket panel and pocket sheet are comprised of vinyl.

4. A pocketed leaf according to claim 1 wherein the pocket panel and pocket sheet are comprised of thermoplastic.

5. A pocketed leaf according to claim 1 wherein the pocket panel and pocket sheet are at least partly comprised of heat sealable synthetic fibers.

6. A pocketed leaf according to claim 1 wherein the pocket panel includes a first outer layer constructed of a heat sealable material and a second inner layer comprised of heat sealable non-woven fabric adhered to said first layer, wherein the non-woven fabric layer forms an inside surface in the first and second pockets.

7. A combination compact disc holder and informational booklet comprising:
    (a) a paper cover having a fold which divides the cover into a first cover panel and a second cover panel, the first and second cover panels each having an inside surface and an outside surface;
    (b) at least one pocketed leaf comprising:
        (i) a pocket panel including a fold line dividing the panel into a first portion and a second portion, the first and second portions each including an inner and an outer face; and
        (ii) a pocket on the inner face of at least one of the first and second portions of the pocket panel, the pocket being formed by a pocket sheet thermally fused to said inner face along a seam;
        (iii) wherein the pocket sheet and pocket panel are at least partially formed of a heat sealable material; and
        (iv) the pocket including an entrance opening between the pocket panel and pocket sheet, and being of such size and shape as to receive and retain a compact disc therein; and
    (c) a booklet of multiple paper leaves, the at least one pocketed leaf and the paper leaves being folded and sewn together along the fold line of the pocket panel to form pages, the pages being of substantially the same size and shape as the first and second panels of the cover;
    (d) wherein the rear faces of the first and second portions of the panel of the at least one pocketed leaf are adhered to the inside surfaces of the first and second cover panels respectively, thereby forming pockets on inside faces of the cover panels.

8. A combination compact disc holder and informational booklet comprising:
    (a) a paper cover having a fold which divides the cover into a first cover panel and a second cover panel, the first and second cover panels each having an inside surface and an outside surface;
    (b) a fly sheet having a back face;
    (c) at least one pocketed leaf comprising:
        (i) a pocket panel including a fold line dividing the panel into a first portion and a second portion, the first and second portions each including an inner and an outer face; and
        (ii) a pocket on the inner face of at least one of the first and second portions of the pocket panel, the pocket being formed by a pocket sheet thermally fused to said inner face along a seam;
        (iii) wherein the pocket sheet and pocket panel are at least partially formed of a heat sealable material; and
        (iv) the pocket including an entrance opening between the pocket panel and pocket sheet, and being of such size and share as to receive and retain a compact disc therein; and
    (d) a booklet of multiple paper leaves;
    (e) wherein the fly sheet, the at least one pocketed leaf, and the paper leaves are folded and sewn together along the fold line of the pocket panel to form pages, the pages being of substantially the same size and shape as the first and second panels of the cover; and
    (f) wherein the back face of the fly sheet is adhered to the inside surfaces of the first and second cover panels.

9. A pocketed leaf for a combination compact disc holder and informational booklet comprising:
    (a) first and second composite panels having substantially the same size and shape, each composite panel including a layer of heat sealable material on a back side, and a layer of heat sealable non-woven fabric on a pocket-receiving side, the composite panels being stacked with their back sides together, the stacked panels being divided into first and second portions by a fold line, and the first and second portions each having an inner face and an outer face;
    (b) a plurality of heat sealable pocket sheets, at least one pocket sheet overlying each of the inner and outer faces of the first and second portions;
    (c) wherein the stacked composite panels forming the first portion and the pocket sheets overlying the first portion are thermally fused together along a first seam, and wherein the stacked composite panels forming the second portion and the pocket sheets overlying the second portion are thermally fused together along a second seam, thereby forming pockets on the front and back faces of the first and second portions;

(d) wherein said pockets each include an entrance opening, and the pockets are each shaped to receive and support a compact disc therein.

10. The pocketed leaf according to claim 9 wherein the pocket sheet forming each pocket includes a cutout proximate the pocket opening, wherein the cutout is of suitable size and shape to facilitate grasping a compact disc in the pocket.

11. A combination compact disc holder and informational booklet comprising:

(a) a paper cover having a fold which divides the cover into a first cover panel and a second cover panel, the first and second cover panels each having an inside surface and an outside surface;

(b) a fly sheet having a back face;

(c) at least one pocketed leaf comprising:
  (i) first and second composite panels having substantially the same size and shape, each composite panel including a layer of heat sealable material on a back side, and a layer of heat sealable non-woven fabric on a pocket-receiving side, the composite panels being stacked with their back sides together, the stacked panels being divided into first and second portions by a fold line, and the first and second portions each having an inner face and an outer face;
  (ii) a plurality of heat sealable pocket sheets, at least one pocket sheet overlying each of the inner and outer faces of the first and second portions;
  (iii) wherein the stacked composite panels forming the first portion and the pocket sheets overlying the first portion are thermally fused together along a first seam, and wherein the stacked composite panels forming the second portion and the pocket sheets overlying the second portion are thermally fused together along a second seam, thereby forming pockets on the front and back faces of the first and second portions;
  (iv) wherein said pockets each include an entrance opening, and the pockets are each shaped to receive and support a compact disc therein; and (d) a booklet of multiple paper leaves;

(e) wherein the fly sheet, the at least one pocketed leaf, and the paper leaves are folded and sewn together along the fold line of the pocket panel to form pages, the pages being of substantially the same size and shape as the first and second panels of the cover; and (f) wherein the back face of the fly sheet is adhered to the inside surfaces of the first and second cover panels.

* * * * *